United States Patent [19]

Ashmont et al.

[11] Patent Number: 4,790,999
[45] Date of Patent: Dec. 13, 1988

[54] ALCOHOLIC SOFT ICE

[75] Inventors: Robert S. Ashmont, Farmington; Thomas C. Bibeau, Windsor; Anthony Livaich, Hartford; Nancy J. McCormick, Farmington, all of Conn.

[73] Assignee: Heublein, Inc., Hartford, Conn.

[21] Appl. No.: 925,441

[22] Filed: Oct. 31, 1986

[51] Int. Cl.$^4$ ................................. C12G 3/06
[52] U.S. Cl. ..................... 426/592; 426/115
[58] Field of Search ............ 426/592, 66, 68, 67, 426/115, 324, 327, 330.3, 393, 565, 590, 567, 330.5, 321, 578

[56] References Cited

U.S. PATENT DOCUMENTS

| | | | |
|---|---|---|---|
| 2,139,836 | 12/1938 | London | 426/327 |
| 3,073,703 | 1/1963 | Dunn | 426/590 |
| 3,554,771 | 1/1971 | Wiczer | 426/564 |
| 3,607,307 | 9/1971 | Peyser | 426/327 |
| 3,619,205 | 11/1971 | Le Van | 426/590 |
| 3,647,472 | 3/1972 | Speech et al. | 99/34 |
| 3,779,372 | 12/1973 | Lloret | 426/115 |
| 3,826,829 | 7/1974 | Marulich | 426/190 |
| 3,843,809 | 10/1974 | Luck | 426/592 |
| 3,897,571 | 7/1975 | Homler et al. | 426/327 |
| 4,021,583 | 5/1977 | Arden | 426/327 |
| 4,235,936 | 11/1980 | Kahn | 426/330.3 |
| 4,332,824 | 6/1982 | Kahn | 426/330.3 |
| 4,387,109 | 6/1983 | Kahn | 426/321 |

FOREIGN PATENT DOCUMENTS 60-37972 2/1985 Japan ........................... 426/592

OTHER PUBLICATIONS

Whistler, R. L., *Industrial Gums*, Academic Press (New York and London 1959), pp. 649–651.
Beale et al., 1972, Mixer and Blender Cookery, Pitman Publishing, Great Britain, pp. 124–125.

Primary Examiner—Donald E. Czaja
Assistant Examiner—Carolyn Paden
Attorney, Agent, or Firm—McCormick, Paulding and Huber

[57] ABSTRACT

The invention provides a ready-to-consume, freezeable, alcoholic beverage composed of water, sugars, alcohol, flavorants and carboxymethylcellulose. The beverage can be placed in a consumer or commercial freezer to form a soft ice, which can be consumed "as is" or can be spooned into a glass to provide, with stirring, an attractive slush-type frozen cocktail.

17 Claims, No Drawings

ALCOHOLIC SOFT ICE

FIELD OF THE INVENTION

This invention relates to a ready-to-consume alcoholic beverage which forms a soft ice at freezer temperatures. More specifically, the invention relates to a shelf-stable, ready-to-consume alcoholic beverage which becomes an attractive frozen beverage when placed in a consumer or commercial freezer.

DESCRIPTION OF RELATED ART

Frozen cocktails have long been popular bar items. But as an in-home mixed drink, frozen cocktails are less popular because of the fuss and complexity of making them at home. Similarly, although numerous packaged alcoholic cocktails in ready-to-consume form have been marketed to consumers, packaged freezeable cocktails containing alcohol have not been available.

The art has sought to provide non-alcoholic freeze-thaw stable, take-home drinks of the slush type. For example, U.S. Pat. No. 3,826,829 to Marulich discloses a carbonated liquid suitable for producing a slush beverage which is composed of water, carbohydrates, polyhydric alcohols, such as glycerol and from about 0.4 to 1% by weight of a low methoxyl pectin and from 0.05% to 0.2% by weight of other gums. U.S. Pat. No. 3,897,571 to Homler, et al, discloses a method for providing a take-home type concentrate for which in turn is used at home to form a slush non-alcoholic drink. The concentrate is prepared by partially crystallizing a saccharidal, aqueous hydrated gum-containing viscous solution while incorporating a gaseous phase therein to form a stable tertiary phase of concentrated syrup matrix interspersed with coarse ice crystals and containing a gaseous foam. The complex process and/or formulation requirements of these products is apparent. Such complexities add to product cost and/or can reduce the consumer and manufacturing acceptability of the product.

U.S. Pat. No. 3,647,472 to Speech, et al, discloses a non-alcoholic cocktail mix containing ingredients in proportions such that the mix can be stored under subfreezing conditions in a frozen slush form. The concentrate is added to water or to alcoholic spirits to provide a cold consumable beverage. Since this product is formulated for substantial dilution prior to consumption, mouth feel, taste and other consumer perceptions of the slush product, per se, are not a substantial consideration in the product formulation.

U.S. Pat. Nos. 4,387,109; 4,332,824, 4,235,936 and related parent, continuation and continuation-in-part patents issued to Kahn, et al, disclose intermediate-moisture frozen foods, including, beverage concentrates. The beverage concentrates disclosed in these patents flow at freezer temperatures and are microbiologically stable at room temperature. The products contain water, sugar (including fructose and/or dextrose) and flavorings. The beverage concentrates are substantially non-crystalline, i.e., flowable, at freezer temperatures. As with the above, the beverage concentrates are diluted prior to consumption, and thus, taste, mouth feel, and other consumer perceptions of the concentrate are not of substantial importance.

None of these references disclose the preparation of an alcoholic cocktail which can be used to prepare a frozen cocktail simply by placing in a freezer. Nor do the references disclose the formation of such an alcoholic beverage that can remain in the frozen or partially frozen state for substantial periods of up to 10 to 20 minutes.

It would be highly desirable to provide a ready-to-consume alcoholic beverage which can be converted into a ready-to-consume frozen cocktail by the consumer, simply by placing the beverage in the consumer's home freezer. Such a product, after freezing, should be neither too hard nor too soft when frozen in any of various freezers including consumer or commercial freezers, which freeze products at different temperatures and at different rates. Additionally, it would be highly desirable if such product could have substantial microbiological stability whether stored in unfrozen or frozen form. Additionally, it would be highly desirable if such product could be provided having desirable organoleptic properties, including an attractive and refreshing taste and a pleasant mouth feel.

SUMMARY OF THE INVENTION

The invention provides a ready-to-consume freezeable, alcoholic beverage comprising water, sugars, alcohol, flavorants and carboxymethylcellulose. Advantageously, the sugars consist primarily of fructose and dextrose. The beverage has a proof in the range of about 10 to about 25. The carboxymethylcellulose is present in an amount ranging from about 0.02 to about 0.1% by weight. The ready-to-consume alcoholic beverage forms a soft ice at normal freezer temperatures, i.e., temperatures between about 0° F. and about 10° F. The beverage can be readily consumed in the soft ice form. Or the soft ice can be spooned into a glass to provide a slush-type cocktail. Since the frozen beverage is provided in the form of a soft ice, the beverage has a substantial lifetime in the frozen state or partially frozen between the time removed from the freezer and consumed by the consumer.

Surprisingly, the ready-to-consume beverage of the invention, can be formulated from readily available and simple components and prepared by straightforward, simple mixing, but is stable at room temperatures or at freezer temperatures in a sealed package. The product is freeze-thaw stable. That is, the product can be frozen and completely melted any number of times while still maintaining the ability to form a soft ice over the normal range of consumer freezer temperatures. Additionally, the product forms a soft ice in consumer freezers which rapidly chill materials and in freezers which are less efficient.

DETAILED DESCRIPTION OF THE INVENTION

It will be apparent that the terms "alcoholic" and "alcohol" as used herein, refer to ethyl alcohol, the well-known alcohol employed in alcoholic beverages. The ready-to-consume alcoholic beverages of the invention will have a proof ranging from about 10 to about 25, and preferably within the range of about 15 to about 20. The alcoholic content of the beverage will have a substantial impact on the organoleptic properties of the beverage. In addition, the alcoholic content will have a substantial impact on the capability of the beverage to form a soft ice at consumer freezer temperatures. As discussed hereinafter, proportions of other ingredients in the alcoholic beverage can be adjusted to provide a product capable of forming a soft ice whether the product has a high or a low alcohol content.

An important aspect of the invention is the physical state of the product at freezer conditions. The product of this invention will form a "soft ice" when frozen under any of various typical home consumer conditions in the range of between about 0° and about 10° F., preferably between about −5° F. and about 12° F. As used herein, the term "soft ice" is intended to describe a product composed primarily of fragile ice crystals such that the product is neither pourable nor hard as an ice cube. Rather, the soft ice will be plastic or deformable and is spoonable; that is, the texture and flexibility of the product are such that when in the form of a soft ice, it can readily be penetrated by a spoon under hand pressure. To determine whether a product forms a soft ice at freezer temperatures in the range of between 0° and 10° F., the product is held at a temperature within that range for a period of 24 hours. Preferably, the products of the invention will form a soft ice after storage in a typical home freezer, at a temperature within the 0°–10° F. range, for a period of 6–12 hours.

The products of the invention are generally characterized by a sugar content in the range of between about 15° to about 28° BRIX (percent solids). The sugars perform a number of important functions including, obviously, sweetening the product and also lowering the freezing point of the product and improving the microbiological stability thereof. Sugars also help control ice crystal size. The exact amount and composition of the sugars must be adjusted depending on the alcohol content of the beverage. Increasing the amount of sugars will decrease the freezing point of the mixture. Thus, lower alcoholic proof beverages will have higher sugar content and vice versa. The sugars used in the beverage preferably consist primarily of fructose and/or dextrose. Thus, preferably fructose and/or dextrose will constitute at least 50% by weight of the sugars present, more preferably 75% or more of the sugars present.

Those skilled in the art will recognize that the lower molecular weight sugars, fructose and dextrose, will depress freezing point of a solution greater on a weight additive basis than the higher molecular weight sugars such as sucrose. The proper combination of sugars can thus be varied to provide the desired organoleptic properties of the beverage. Low molecular weight sugars, preferably fructose, are preferred as these sugars are believed to help minimize ice crystal size. Most preferred sugars for use in this invention are the high fructose corn syrups which are preferably used in an amount sufficient to provide a percent BRIX content in the final beverage ranging from about 18° to about 25° BRIX, most preferably from about 20° to about 23° BRIX.

The carboxymethylcellulose (CMC) is a critical component of the beverages of the invention. Surprisingly, it has been found that when used in very small amounts, i.e., less than 0.1% by weight, a noticeable improvement on the product is obtained. When the same product is prepared with and without CMC, the freezing characteristics of the product are different, particularly under unoptimum freezer conditions. Thus, the product without the CMC will freeze to a harder product, and/or will contain coarser, rougher ice crystals. This is particularly true when the product is frozen under unoptimum conditions, i.e., at a slow rate and/or at temperatures close to 10° F. and/or at or below 0° F. These conditions are typical of many consumer home freezers. Surprisingly, the CMC, when used in amounts ranging from as low as 0.020% by weight up to about 0.1% by weight, results in a product having fragile ice crystals, which may be in the form of fragile, thin sheets. Preferably, the CMC will be used in an amount ranging from about 0.025% to about 0.06% by weight, most prefereably between about 0.025% and about 0.04% by weight. When larger amounts of CMC are used, the product can be perceived as unacceptably "gummy" by taste panels; whereas, when smaller amounts of CMC are used, the product can be preceived as too coarse and rough. Typically, the CMC will be the sodium salt. Advantageously, the particular CMC used will be a low viscosity CMC, such materials being known to those skilled in the art and discussed at pages 643–645 of INDUSTRIAL GUMS, Whistler, R. L., et al (Academic Press, London, 1959), which is hereby incorporated by reference.

Advantageously, the ready-to-consume beverage of the invention will additionally contain an acidulant such as a carboxylic acid, for example, such as citric acid, malic acid, tartaric acid, fumeric acid, and the like, preferably citric acid. The acidulant will preferably be present in an amount ranging from about 0.5 to 2.0% by weight, preferably 0.75 to 1.5% by weight. It will be recognized that the amount of acid will be proportioned according to the sweetness of the beverage; more acid is used with sweeter beverages whereas less acid is used with lower sugar content beverages.

The alcoholic beverages of the invention will additionally contain minor amounts of flavorants. Advantageously, such flavorants can preferably include one or more essential oils in a small amount and/or, compounded flavors, natural extractants, juice concentrates and the like. The flavorants will typically be present in an amount of less than about 5% by weight, preferably about 1% by weight or less.

The beverage of the invention can be marketed to consumers in any of various forms, for example, in a one, two, three, etc., liter container. With large containers, the consumer can simply pour the beverage into a smaller container which in turn, can be placed in the freezer for 6–8 hours. In a particularly preferred aspect of this invention, the beverage will be packaged in a plastic container having a size of one liter or less, which can be placed in a consumer or commercial freezer without opening and which is stable in the freezer environment.

Most advantageously, the beverage is packaged in the containers disclosed in Co-pending U.S. patent application Ser. No. 889,434, filed July 25, 1986, titled "Shelf Stable Plastic Packaged Alcoholic Beverage Containing Essential Oils", the disclosure of which is hereby incorporated by reference. Such containers include an interior layer in contact with the alcoholic beverage and a second layer. The interior layer consists of polypropylene homopolymer. The second layer is located exterior to the interior layer and is composed of an oxygen barrier polymer such as ethylene vinyl alcohol copolymer or nylon. The container can also have an outer layer such a polyolefin homo- or co-polymer for added strength or to provide a printable surface. The container can be provided in a single serving size in the shape of a cup, or in a larger size, e.g., up to one liter. The container closure, which can be peelable or reusable lidding, also has an interior surface composed of polypropylene homopolymer or an adduct thereof with maleic acid or the like.

One such preferred container is a 200 ml cup having a wall thickness of 14–18 mils (0.014–0.018 in.) having the structure from exterior to interior: polyolefin/adhesive/EVOH/adhesive/polypropylene homopolymer. Such a cup is commercially available from Rampart Packaging, Inc. The cup can be sealed with a peelable lidding commercially available from RJR Archer, Inc., composed of aluminum foil having an ultrathin coating on its interior surface of a maleic acid adduct of polypropylene (MORPRIME commercially available from Morton Chemical Co.). Such a container can also be provided in a larger size, yet still small enough to be placed in a freezer, i.e., in a size up to one liter. When packaged in accordance with this preferred embodiment, the beverage is shelf stable for periods in excess of a year, even in unfrozen form. When thus packaged, an exceptionally attractive consumer product is provided since the consumer can transfer the plastic packaged beverage directly into the freezer without changing containers. The plastic container is stable in the freezer environment which is not necessarily true with glass containers.

The following examples serve to illustrate the invention and the best mode contemplated by the inventors for carrying out the invention.

EXAMPLE 1

This example illustrates preparation of an 18 proof margarita. The product was prepared from the following components:

|  | 18° Proof MARGARITA |
|---|---|
| INGREDIENTS % (by weight) |  |
| Spirits | TEQUILA & NEUTRAL SPIRITS |
| High Fructose Corn Syrup |  |
| Dextrose (50%) | 10.8152–11.0961 |
| Fructose (42%) | 9.0848–9.3207 |
| Maltose (1.5%) | 0.3245–0.3329 |
| Isomaltose (1.5%) | 0.3245–0.3329 |
| Higher Saccharides (5.0%) | 1.0815–1.1096 |
| Dry Basis (Total) | 21.6305–22.1922 |
| *Sodium CMC | .03848–.03869 |
| Citric Acid | .8245–.8291 |
| OTHER INGREDIENTS % (by volume) |  |
| Essential Oils | .01171 |
| Other Flavors | N/A |
| PRODUCT SPECS. |  |
| pH | 2.5 |
| Total Solids (°Brix) | 23 |
| Total Acidity (gm/l) | 9.3 |

*Low viscosity, fine grind commercially available as CMC-7LF from Hercules Powder.

The procedure for preparing the product simply involved mixing the spirits, flavorings, corn syrup and water together; followed by addition of the tequila and the citric acid as an aqueous solution. Following preparation of the mixture, the proof was measured and water was added in an amount sufficient to adjust the proof to 18. The beverage was then subjected to a fast heat treatment to assure commercial sterility thereof by means well known to the art.

These beverages formed a pleasant soft ice composition when placed in a freezer for six hours or more. The beverage could be eaten as soft ice or spooned into a serving glass and stirred to form a slush type beverage.

If the same formulation is prepared without the sodium carboxymethylcellulose, the compositions will freeze into an ice having harder, coarser crystals.

EXAMPLE 2

A strawberry daiquiri was prepared following the procedure of Example 1 and having the following composition:

|  | 18° Proof STRAWBERRY DAIQUIRI |
|---|---|
| INGREDIENTS % (by weight) |  |
| Spirits | RUM |
| High Fructose Corn Syrup |  |
| Dextrose (50%) | 10.7761–11.0557 |
| Fructose (42%) | 9.0519–9.2868 |
| Maltose (1.5%) | 0.3233–0.3317 |
| Isomaltose (1.5%) | 0.3233–0.3317 |
| Higher Saccharides (5.0%) | 1.0776–1.1056 |
| Dry Basis (Total) | 21.5522–22.1115 |
| *Sodium CMC | .03848–.03855 |
| Citric Acid | 1.0954–1.1014 |
| OTHER INGREDIENTS % (by volume) |  |
| Essential Oils | .00038 |
| Other Flavors | 0.60 |
| PRODUCT SPECS. |  |
| pH | 2.4 |
| Total Solids (°Brix) | 24 |
| Total Acidity (gm/l) | 12.8 |

*Low viscosity, fine grind commercially available as CMC-7LF from Hercules Powder.

These compositions when placed in a typical home freezer for about 6–8 hours forms an attractive soft ice composition having fragile, palatable crystals. The soft ice can be consumed, as is, or can be spooned into a serving glass to provide, with stirring, an attractive and refreshing frozen cocktail. When the same beverage is prepared without the sodium carboxymethylcellulose and then frozen for 6–8 hours in a home freezer, the product will have coarser, grainier crystals.

EXAMPLE 3

A 15° margarita was prepared as in the previous examples and having the following composition:

|  | 15° Proof MARGARITA |
|---|---|
| KEY INGREDIENTS % (by weight) |  |
| Spirits | TEQUILA & NEUTRAL SPIRITS |
| High Fructose Corn Syrup |  |
| Dextrose (50%) | 8.7806–9.0103 |
| Fructose (42%) | 7.3756–7.5687 |
| Maltose (1.5%) | .2634–.2703 |
| Isomaltose (1.5%) | .2634–.2703 |
| Higher Saccharides (5.0%) | .8781–.9010 |
| Dry Basis (Total) | 17.5611–18.0206 |
| *Sodium CMC | .03347–.03366 |
| Citric Acid | .5578–.5610 |
| OTHER INGREDIENTS % (by volume) |  |
| Essential Oils | .0117 |
| Other Flavors | N/A |
| PRODUCT SPECS. |  |
| pH | 2.5 |
| Total Solids (°Brix) | 19.2 |

| | 15° Proof MARGARITA |
|---|---|
| Total Acidity (gm/l) | 6.1 |

*Low viscosity, fine grind commercially available as CMC-7LF from Hercules Powder This product when frozen had characteristics comparable to those of the previous examples.

EXAMPLE 4

A 25° margarita was prepared as in the previous examples from the following ingredients:

| | 25° Proof MARGARITA |
|---|---|
| KEY INGREDIENTS % (by weight) | |
| Spirits | TEQUILA & NEUTRAL SPIRITS |
| High Fructose Corn Syrup | |
| Dextrose (50%) | 7.1578–7.3451 |
| Fructose (42%) | 6.0125–6.1699 |
| Maltose (1.5%) | 0.2148–0.2203 |
| Isomaltose (1.5%) | 0.2148–0.2203 |
| Higher Saccharides (5.0%) | 0.7157–0.7345 |
| Dry Basis (Total) | 14.3156–14.6901 |
| *Sodium CMC | .03411–.03438 |
| Citric Acid | 1.7621–1.7722 |
| OTHER INGREDIENTS % (by volume) | |
| Essential Oils | .01171 |
| Other Flavors | N/A |
| PRODUCT SPECS. | |
| pH | 2.8 |
| Total Solids (°Brix) | 16 |
| Total Acidity (gm/10) | 18.4 |

*Low viscosity, fine grind commercially available as CMC-7LF from Hercules Powder.

This product took somewhat longer to freeze than products of the previous examples. The frozen product was coarser than those of the previous examples.

EXAMPLE 5

A 10° margarita was prepared as in the previous examples and having the following ingredients:

| | 10° PROOF MARGARITA |
|---|---|
| KEY INGREDIENTS % (by weight) | |
| Spirits | Tequila & Neutral Spirits |
| High Fructose Corn Syrup | |
| Dextrose (50%) | 12.7086–13.0371 |
| Fructose (42%) | 10.6752–10.9512 |
| Maltose (1.5%) | 0.3813–0.3911 |
| Isomaltose (1.5%) | 0.3813–0.3911 |
| Higher Saccharides (5.0%) | 1.2708–1.3037 |
| Dry Basis (Total) | 25.4172–27.0742 |
| *Sodium CMC | .3767–.03788 |
| Citric Acid | .8074–.8118 |
| OTHER INGREDIENTS (by volume) | |
| Essential Oils | .01171 |
| PRODUCT SPECS. | |
| pH | 2.5 |
| Total Solids (°Brix) | 27 |
| Total Acidity (gm/1) | 9.3 |

*Low Viscosity, fine grind commercially available as CMC-7LF from Hercules Powder.

This product when frozen was firmer than products of the previous examples. The crystal size/texture was still smooth/fine comparable to previous examples.

The invention has been described in considerable detail with specific reference to preferred embodiments. However, variations and modifications can be made without departing from the spirit and scope of the invention as described in the foregoing specification and defined in the appended claims.

We claim:

1. A shelf stable, ready-to-consume alcoholic beverage comprising water, sugars, alcohol, flavorants, and carboxymethylcellulose wherein the sugars comprise at least one sugar selected from the group consisting of fructose and dextrose; the beverage has a proof in the range of about 10 to about 25; the carboxymethylcellulose is present in an amount ranging from about 0.02 to about 0.1% by weight; and wherein the ready-to-consume alcoholic beverage forms a soft ice upon being subjected to a temperature range of about 0° to about 10° F. and can be frozen and completely re-melted any number of times while maintaining the ability to form a soft ice at said temperature range.

2. The ready-to-consume alcoholic beverage defined in claim 1 wherein the beverage has a proof ranging from about 15 to about 20.

3. The ready-to-consume alcoholic beverage defined in claim 2 additionally comprising one or more essential oils in an amount of less than 1% by weight.

4. The ready-to-consume alcoholic beverage defined in claim 1 and having a sugar content in the range of from about 15° to about 28° BRIX.

5. The ready-to-consume alcoholic beverage defined in claim 4 having a sugar content in the range of between 18° and about 25° BRIX.

6. The ready-to-consume alcoholic beverage defined in claim 5 and packaged in a plastic container such that the beverage is shelf-stable in frozen or unfrozen form and wherein the container has a size of one liter or less.

7. The ready-to-consume alcoholic beverage defined in claim 4 wherein the sugars consist primarily of fructose and dextrose.

8. The ready-to-consume alcoholic beverage defined in claim 7 wherein the fructose and dextrose constitute at least about 75% of the sugars present in the beverage.

9. The ready-to-consume alcoholic beverage defined in claim 7 additionally comprising citric acid present in an amount ranging from about 0.75% to about 1.5% by weight.

10. The ready-to-consume alcoholic beverage defined in claim 4 which additionally comprises an acidulant present in an amount ranging from about 0.5 to about 2.0% by weight.

11. The ready-to-consume alcoholic beverage defined in claim 4 wherein the carboxymethylcellulose is present in an amount ranging from about 0.025% to about 0.6% by weight.

12. The ready-to-consume alcoholic beverage defined in claim 1 wherein carboxymethylcellulose is present in an amount ranging from about 0.025 to about 0.06% percent by weight.

13. The ready-to-consume alcoholic beverage defined in claim 12 wherein the sodium carboxymethylcellulose is a low viscosity sodium carboxymethylcellulose.

14. The ready-to-consume alcoholic beverage defined in claim 13 wherein the alcoholic beverage has a proof in the range of between about 15 and about 20.

15. The ready-to-consume alcoholic beverages defined in claim 14 wherein the alcoholic beverage has a proof in the range of 16 to 19.

16. The ready-to-consume alcoholic beverage defined in claim 1 and packaged in a sealed plastic container such that the beverage is shelf-stable in frozen or unfrozen form and wherein the container has a size of one liter or less.

17. The shelf stable, ready-to-consume alcoholic beverage defined in claim 1 wherein the beverage is shelf stable at room temperatures or freezer temperatures in a sealed package.

* * * * *